(12) United States Patent
Studer et al.

(10) Patent No.: US 7,761,256 B2
(45) Date of Patent: Jul. 20, 2010

(54) METHOD AND SYSTEM FOR USE IN ANALYZING VIBRATIONS OF A VARIABLE SPEED ROTATING BODY

(75) Inventors: John Henry Studer, Lemon Grove, CA (US); John Lynn Abbott, San Diego, CA (US)

(73) Assignee: General Electric Company, Schenectady, NY (US)

( * ) Notice: Subject to any disclaimer, the term of this patent is extended or adjusted under 35 U.S.C. 154(b) by 362 days.

(21) Appl. No.: 11/962,806

(22) Filed: Dec. 21, 2007

(65) Prior Publication Data

US 2009/0164142 A1    Jun. 25, 2009

(51) Int. Cl.
G06F 19/00 (2006.01)
(52) U.S. Cl. .................. 702/145; 702/56; 702/33; 702/182; 702/183; 702/141; 702/147; 702/165; 702/142; 73/579; 73/602; 73/649; 73/460; 73/462; 73/468; 73/570; 73/593; 73/660; 340/683; 340/679
(58) Field of Classification Search .................. 702/56, 702/33, 182, 183, 184, 147, 145, 165, 142, 702/151; 73/602, 649, 579, 460, 462, 468, 73/570, 593, 660; 340/682, 683, 679
See application file for complete search history.

(56) References Cited

U.S. PATENT DOCUMENTS

| | | | | |
|---|---|---|---|---|
| 4,408,285 A * | 10/1983 | Sisson et al. | .................. | 702/56 |
| 4,996,880 A * | 3/1991 | Leon et al. | ..................... | 73/660 |
| 5,825,657 A * | 10/1998 | Hernandez | .................. | 702/182 |
| 6,789,422 B1 * | 9/2004 | Ward, Jr. | ...................... | 73/462 |
| 6,801,873 B1 * | 10/2004 | Jin et al. | ..................... | 702/147 |
| 6,847,917 B2 * | 1/2005 | Bechhoefer | ................. | 702/183 |
| 7,054,761 B2 | 5/2006 | Lindberg et al. | | |
| 7,099,782 B2 * | 8/2006 | Hitchcock et al. | ............. | 702/56 |
| 7,167,814 B2 | 1/2007 | Lindberg et al. | | |
| 7,200,519 B2 | 4/2007 | Lindberg et al. | | |
| 7,313,484 B2 | 12/2007 | Lindberg et al. | | |
| 7,324,919 B2 * | 1/2008 | Lindberg et al. | ............ | 702/182 |
| 7,487,679 B2 * | 2/2009 | Sirrine et al. | ................. | 73/660 |
| 7,536,265 B2 * | 5/2009 | Chen et al. | ..................... | 702/56 |
| 2004/0199348 A1 * | 10/2004 | Hitchcock et al. | ............. | 702/92 |

\* cited by examiner

*Primary Examiner*—Carol S Tsai
(74) *Attorney, Agent, or Firm*—William Scott Andes, Esq.; Armstrong Teasdale LLP

(57) ABSTRACT

A method is provided for analyzing vibrations of a variable speed rotating body. The method includes producing a signal that is proportional to an acceleration of the rotating body and producing a plurality of pulses. Each pulse represents a revolution of the rotating body and is indicative of a vibration sample at a rotational position of the rotating body. The signal is converted to a numeric value that is indicative of a vibrational amplitude of the rotating body. The plurality of pulses are converted to revolution time periods indicative of a rotational rate of the rotating body. The method also includes producing a harmonic vibrational amplitude at a harmonic of the rotational rate of the rotating body, and representing a phase of the harmonic vibrational amplitude relative to the rotational position of the rotating body.

17 Claims, 2 Drawing Sheets

METHOD AND SYSTEM FOR USE IN ANALYZING VIBRATIONS OF A VARIABLE SPEED ROTATING BODY

BACKGROUND OF THE INVENTION

The field of the present invention relates generally to rotating bodies, and more specifically, to analyzing vibrations of a variable speed rotating body.

Generally, it is important to analyze vibrations of variable speed rotating bodies to detect fault conditions that may require maintenance. For example, such analysis may be useful in monitoring turbine engines to facilitate reducing vibration levels in the turbine engine operation. In particular, vibration analysis may prevent engine damage, and, therefore, reduce costs associated with maintaining and replacing the engine.

At least one known method of analyzing a rotating body determines a phase and amplitude of vibrations in the rotating body relative to the rotating body using a digital computer. Specifically, the digital computer receives digitized values from an accelerometer for a period between two once-per-revolution tachometer pulses. Based on a series of tachometer pulse times, the vibration samples are taken and digitized to produce a desired number of uniformly spaced values. In known methods, the values are processed using a Fourier transform to produce a complex number that is converted to a desired phase and amplitude. Unfortunately, this method has limited use when analyzing a rotating body that rotates at a variable speed.

One variant of the above-described method requires the computer to predict a change in rotational speed. A vibration sampling and digitization rate is then varied by the computer to produce values at equal angular spacing through each revolution. However, it is often difficult to maintain the stability of such a prediction process. Moreover, such a method cannot accurately predict future speeds.

In a more complex method, digitized vibration values are gathered at fixed time intervals for time periods between a series of once-per-revolution tachometer pulses. The digitized vibration values are then interpolated and decimated to produce a required number of values that are uniformly spaced and in a desired angular position through each revolution for a Fourier transform. Unfortunately, this method also requires a large number of arithmetic operations for the interpolation and decimation filter process.

In another approach, specialized tachometer hardware is used to produce both a once-per-revolution pulse and a number of pulses at equal angular spacing through each revolution. Moreover the tachometer is used to provide vibration sample timings for input values of the Fourier transform. However, this method is only applicable using the specialized tachometer hardware which may be costly and/or impractical for use with the rotating body. Also, as with any Fourier method, this method restricts accurate analysis to vibration harmonics less than approximately ⅓ of the number of pulses per revolution.

BRIEF DESCRIPTION OF THE INVENTION

In one aspect, a method is provided for analyzing vibrations of a variable speed rotating body. The method includes producing a signal that is proportional to an acceleration of the rotating body and producing a plurality of pulses. Each pulse represents a revolution of the rotating body and is indicative of a vibration sample at a rotational position of the rotating body. The signal is converted to a numeric value that is indicative of a vibrational amplitude of the rotating body. The plurality of pulses are converted to revolution time periods indicative of a rotational rate of the rotating body. The method also includes producing a harmonic vibrational amplitude at a harmonic of the rotational rate of the rotating body, and representing a phase of the harmonic vibrational amplitude relative to the rotational position of the rotating body.

In another aspect, a system is provided for use in analyzing vibrations of a variable speed rotating body. The system includes at least one sensor configured to produce a signal that is proportional to an acceleration of the rotating body, and at least one tachometer configured to produce a plurality of pulses. Each pulse represents a revolution of the rotating body and is indicative of a vibration sample at a rotational position of the rotating body. The system also includes a processor that is programmed to convert the signal to a numeric value that is indicative of a vibrational amplitude of the rotating body, and convert the plurality of pulses to revolution time periods indicative of a rotational rate of the rotating body. The processor is also programmed to produce a harmonic vibrational amplitude at a harmonic of the rotational rate of the rotating body, and represent a phase of the harmonic vibrational amplitude relative to the rotational position of the rotating body.

In yet another aspect, a processor is provided for use in analyzing vibrations of a variable speed rotating body. The processor includes a converter to convert a signal from at least one sensor to a numeric value that is indicative of a vibrational amplitude of a rotating body. The signal is proportional to an acceleration of the rotating body. The processor also includes a device to convert a plurality of pulses from a tachometer to revolution time periods indicative of a rotational rate of the rotating body. Each pulse represents a revolution of the rotating body and is indicative of a vibration sample at a rotational position of the rotating body. The processor is programmed to produce a harmonic vibrational amplitude at a harmonic of the rotational rate of the rotating body, and represent a phase of the harmonic vibrational amplitude relative to the rotational position of the rotating body.

DETAILED DESCRIPTION OF THE INVENTION

A system is provided for use in analyzing vibrations of a variable speed rotating body. The system is configured to represent a phase of a vibrational amplitude of the rotating body relative to a rotational position of the rotating body. The system is also configured to calculate a velocity of the rotating body at a start of each revolution of the rotating body and at an end of each revolution of the rotating body. Moreover, the system calculates an angular position and an angular velocity of the rotating body. In one embodiment, the system represents the vibrational amplitude of the rotating body relative to the rotational position of the rotating body in polar form. In another embodiment, the system represents a plot of at least one of the acceleration, the velocity, and the displacement of the rotating body.

It should be noted that although the present invention is described with respect to rotating bodies, one of ordinary skill in the art should understand that the present invention is not limited to being used only with rotating bodies. Rather, the present invention may be used with any moving body. Further, the present invention is described herein only with respect to analyzing vibrations. However, as would be appreciated by one of ordinary skill in the art, the present invention may also be used to analyze any movement of a moving body.

Further, as used herein, the term "processor" may include any programmable system including systems using microcontrollers, reduced instruction set circuits (RISC), application specific integrated circuits (ASICs), logic circuits, and any other circuit or processor capable of executing the functions described herein. The examples described herein are exemplary only, and are thus not intended to limit in any way the definition and/or meaning of the term "processor".

Figure 1:
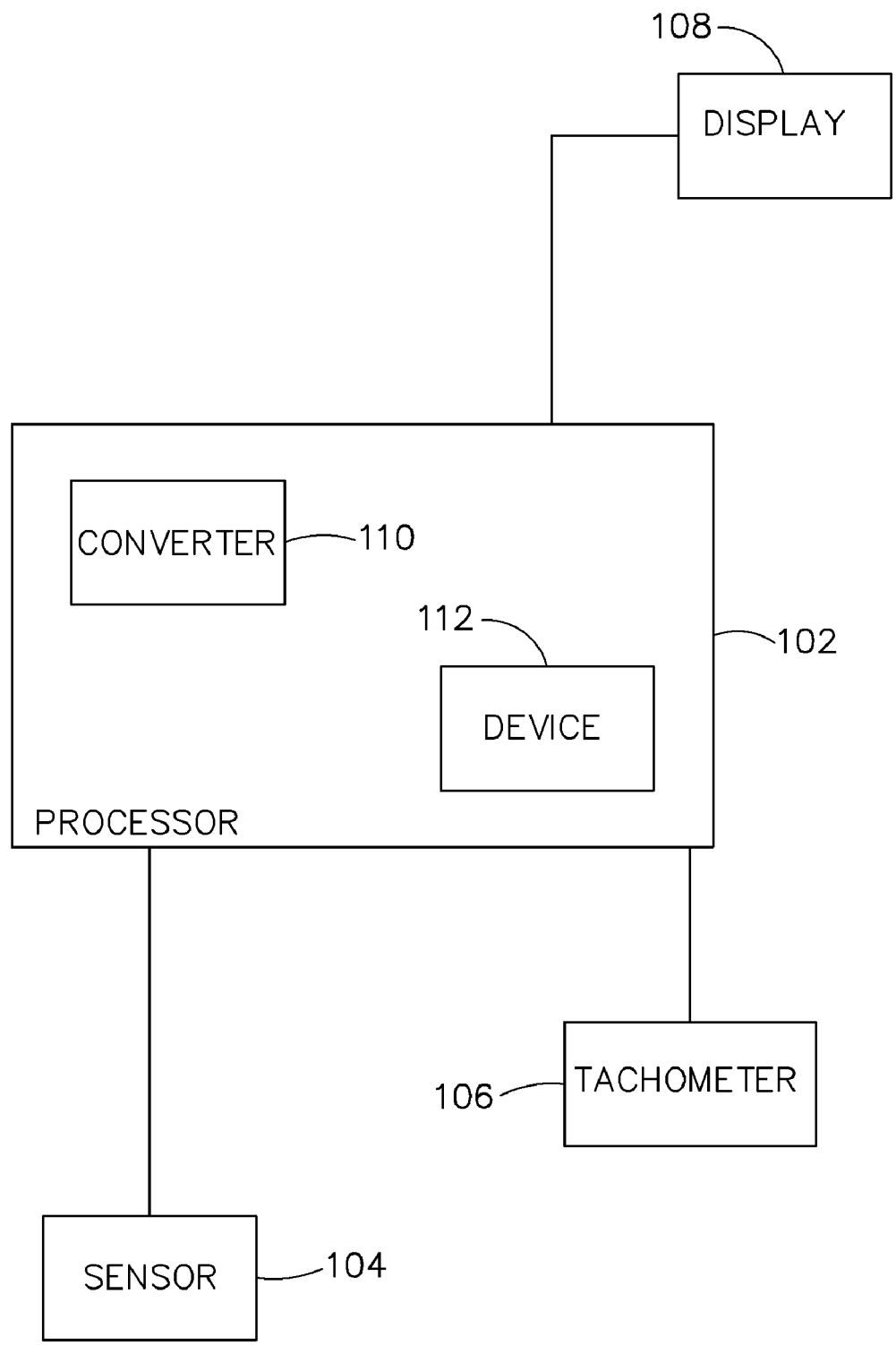
FIG. 1 is a schematic illustration of an exemplary system for analyzing vibrations of a variable speed rotating body.

FIG. 1 is a schematic illustration view of an exemplary system 100 for use in analyzing vibrations of a variable speed rotating body (not shown), such as, but not limited to, a turbine rotor (not shown). System 100 includes a processor 102 that is electrically coupled to at least one sensor 104 and at least one tachometer 106. In the exemplary embodiment, sensor 104 is an accelerometer, and tachometer 106 produces a plurality of pulses that represent a revolution of the rotating body. Sensor 104 produces a signal that is proportional to an acceleration of the rotating body. In the exemplary embodiment, system 100 also includes a display 108 that displays the results of an analysis. In one embodiment, sensor 104, tachometer 106, and/or display 108 are in wireless communication with processor 102.

Processor 102 represents a phase of a vibrational amplitude of the rotating body, relative to a rotational position of the rotating body, using pulses from tachometer 106 and a signal from sensor 104. Specifically, processor 102 includes at least one converter 110 that converts the signal from sensor 104 and at least one device 112 that converts the pulses from tachometer 106. In the exemplary embodiment, converter 110 is at least one of an analog-to-digital converter and any other suitable device for converting the signal from sensor 104. Further, in the exemplary embodiment, device 112 is at least one of a clock and counter circuit, an analog to digital converter, and any other suitable device for converting the pulses from tachometer 106. As described in more detail below, processor 102 converts the signal from sensor 104 and the pulses from tachometer 106 to facilitate representing the phase of the vibrational amplitude of the rotating body relative to the rotational position of the rotating body.

As described below, processor 102 also calculates a velocity of the rotating body at a start of each revolution of the rotating body and at an end of each revolution of the rotating body. Moreover, processor 102 calculates an angular position and an angular velocity of the rotating body. In one embodiment, as described below, processor 102 represents the vibrational amplitude of the rotating body relative to the rotational position of the rotating body in polar form. In another embodiment, processor 102 represents a plot of at least one of the acceleration, the velocity, and the displacement of the rotating body.

Figure 2:
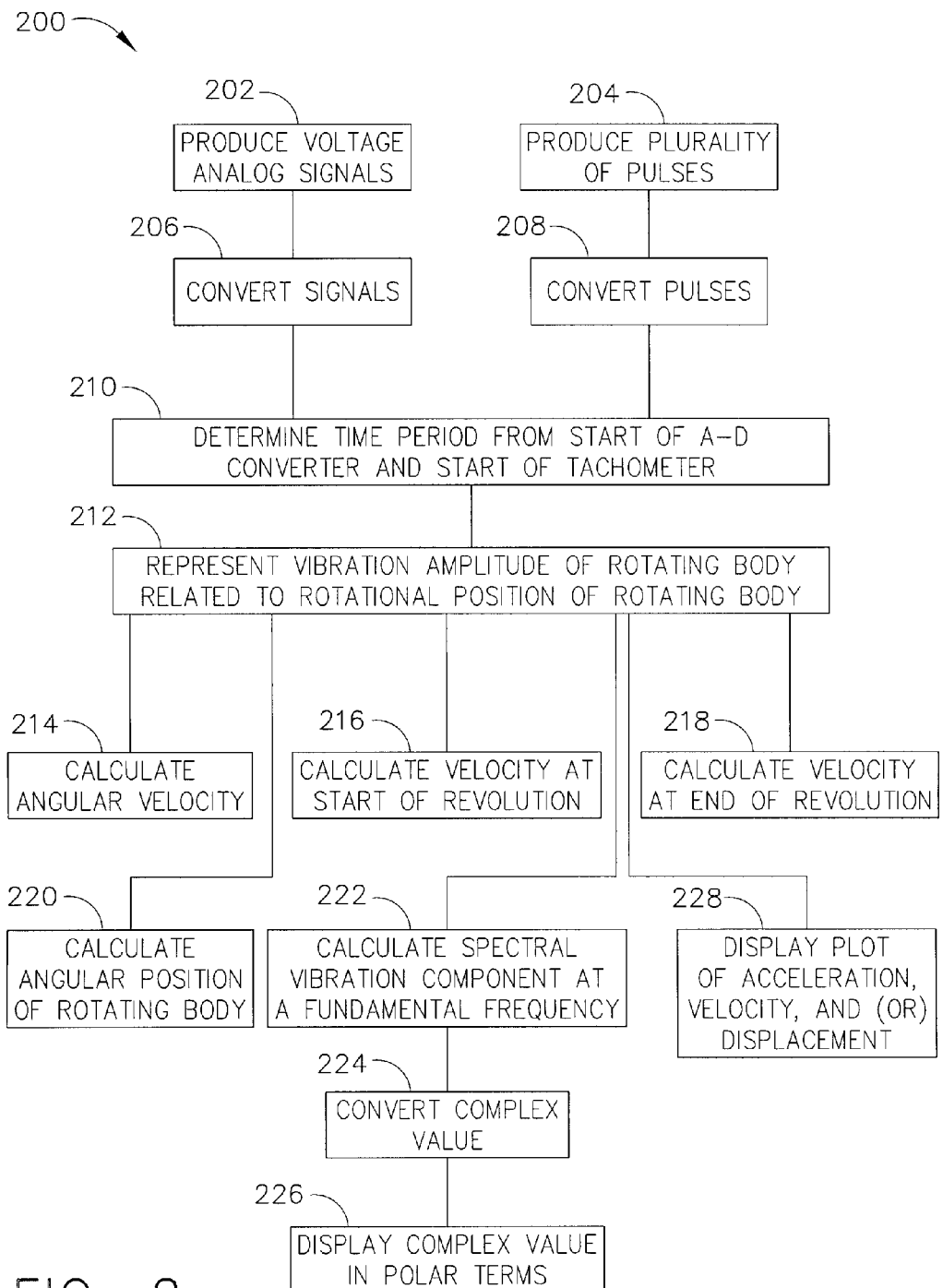
FIG. 2 is a flowchart of an exemplary method for use in analyzing vibrations of a variable speed rotating body using the system shown in FIG. 1.

FIG. 2 is a flowchart of an exemplary method 200 for analyzing vibrations of a variable speed rotating body using system 100. Method 200 includes producing 202 voltage analog signals using the at least one sensor 104 (shown in FIG. 1). In the exemplary embodiment, the signals are proportional to an acceleration of the rotating body (not shown) over a desired range of frequencies. Method 200 also includes producing 204 a plurality of pulse using the at least one tachometer 106 (shown in FIG. 1). In the exemplary embodiment, each pulse represents one revolution of the rotating body.

In the exemplary embodiment, method 200 also includes converting 206 the signal from sensor 104, and converting 208 the pulses from tachometer 106 using processor 102 (shown in FIG. 1). Specifically, in one embodiment, converter 110 (shown in FIG. 1) converts 206 the signal from sensor 104 to proportional numeric values at a constant rate of samples per second. Further, in one embodiment, device 112 (shown in FIG. 1) converts 208 the pulses from tachometer 106 to revolution time periods.

Processor 102 uses the periods of revolution from tachometer 106 and the proportional numeric values from sensor 104 to determine 210 a time period from a substantially simultaneous start of converter 110 and of tachometer 106. Accordingly, a phase of a vibrational amplitude of the rotating body relative to a rotational position of the rotating body can be represented 212 by the tachometer pulses.

Method 200 also includes calculating 214 an angular velocity of the rotating body. In the exemplary embodiment, the angular velocity is calculated 214 by assuming a constant acceleration of the rotating body. A velocity of the rotating body at a start of each revolution of the rotating body is calculated 216, and a velocity of the rotating body at an end of each revolution of the rotating body is calculated 218. In the exemplary embodiment, the velocity at the start of each revolution is calculated 216 as an average of the current velocity of the rotating body and the velocity of a previous revolution of the rotating body. Further, in the exemplary embodiment, the velocity at the end of each revolution is calculated 218 as an average of the current velocity of the rotating body and a velocity of a following revolution of the rotating body.

In the exemplary embodiment, an angular position for each vibration sample between the two tachometer points is also calculated 220. In one embodiment, the angular position is calculated 220 using a measured period of revolution while maintaining substantially continuous velocity and position changes across the revolution. Moreover, in the exemplary embodiment, a complex value representing a spectral vibration component at a fundamental frequency for each revolution is calculated 222 using two weighted convolutions of vibration samples that are multiplied by the cosine (for the real component) or the sine (for the imaginary component) of the interpolated angular positions. In one embodiment, the convolutions are then weighted by half of an angular increment between an angular position of a previous vibration and an angular position of a subsequent vibration.

In one embodiment, the complex value is converted 224 and displayed 226 in polar form. In the exemplary embodiment, a complex value is displayed per each revolution of the rotating body. In another embodiment, a plot of at least one of an acceleration, a velocity, and a displacement of the rotating body is displayed 228. In the exemplary embodiment, the acceleration, velocity, and displacement of the rotating body are plotted per each revolution. In yet another embodiment, harmonics other than the fundamental harmonic (e.g.: $3^{rd}$, $5^{th}$, etc.) are produced by stepping through the cosine and sine functions in steps multiplied by 3, 5, etc.

In the exemplary embodiment, system 100 is capable of analyzing vibrations of a rotating body having varying speeds. Moreover, and advantageously, in the exemplary embodiment, a filter is not required to satisfy the number and spacing requirements of the Fourier transform. Accordingly, because a large computational load is eliminated, a speed of the analysis is facilitated to be increased. Moreover, system 100 does not require specialized tachometer hardware and/or restrictive harmonic analysis.

In one embodiment, a method is provided for analyzing vibrations of a variable speed rotating body. The method includes producing a signal that is proportional to an acceleration of the rotating body and producing a plurality of pulses. Each pulse represents a revolution of the rotating body and is indicative of a vibration sample at a rotational position of the rotating body. The signal is converted to a numeric value that is indicative of a vibrational amplitude of the rotating body. The plurality of pulses are converted to revolution time periods indicative of a rotational rate of the rotating body. The method also includes producing a harmonic vibrational amplitude at a harmonic of the rotational rate of the rotating body, and representing a phase of the harmonic vibrational amplitude relative to the rotational position of the rotating body. In the exemplary embodiment, an angular velocity of the rotating body is calculated based on measured time periods between each tachometer pulse.

In one embodiment a velocity of the rotating body at a start of each revolution of the rotating body and a velocity of the rotating body at an end of each revolution of the rotating body is calculated based on the calculated angular velocity and an angular acceleration of the rotating body. An angular position of the rotating body between each pulse of the tachometer is calculated to produce the harmonic vibrational amplitude.

In one embodiment, the method also includes representing the vibrational amplitude relative to the rotational position of the rotating body in polar form. In another embodiment, the method includes representing a plot of at least one of the acceleration, the velocity, and the displacement of the rotating body.

The above-described systems and methods enable vibrations of a rotating body having varying speeds to be analyzed. The above-described systems and methods also eliminate a large computational load, thereby facilitating increasing a speed of the analysis. Moreover, the above-described systems and methods do not require specialized tachometer hardware and/or restrictive harmonic analysis. Accordingly, costs and/or time associated with maintaining, repairing, and/or replacing a rotating body are facilitated to be reduced.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for analyzing vibrations of a variable speed rotating body are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, it will be recognized that the invention can be practiced with modification within the spirit and scope of the claims.

What is claimed is:

1. A method for analyzing vibrations of a variable speed rotating body, said method comprising:
    producing a signal that is proportional to an acceleration of the rotating body;
    producing a plurality of pulses using a tachometer, wherein each pulse represents a revolution of the rotating body and is indicative of a vibration sample at a rotational position of the rotating body;
    converting the signal to a numeric value that is indicative of a vibrational amplitude of the rotating body;
    converting the plurality of pulses to revolution time periods indicative of a rotational rate of the rotating body;
    calculating an angular position of the rotating body between each pulse of the tachometer to produce a harmonic vibrational amplitude at a harmonic of the rotational rate of the rotating body; and
    representing a phase of the harmonic vibrational amplitude relative to the rotational position of the rotating body.

2. A method in accordance with claim 1, further comprising calculating an angular velocity of the rotating body based on measured time periods between each tachometer pulse.

3. A method in accordance with claim 2, further comprising calculating a velocity of the rotating body at a start of each revolution of the rotating body based on the calculated angular velocity and an angular acceleration of the rotating body.

4. A method in accordance with claim 2, further comprising calculating a velocity of the rotating body at an end of each revolution of the rotating body based on the calculated angular velocity and an angular acceleration of the rotating body.

5. A method in accordance with claim 1, further comprising representing the harmonic vibrational amplitude relative to the rotational position of the rotating body in polar form.

6. A method in accordance with claim 1, further comprising generating a plot of at least one of an acceleration, a velocity, and a displacement of the rotating body.

7. A system for use in analyzing vibrations of a variable speed rotating body, said system comprising:
    at least one sensor configured to produce a signal that is proportional to an acceleration of the rotating body;
    at least one tachometer configured to produce a plurality of pulses, wherein each pulse represents a revolution of the rotating body and is indicative of a vibration sample at a rotational position of the rotating body; and
    a processor programmed to:
        convert the signal to a numeric value that is indicative of a vibrational amplitude of the rotating body;
        convert the plurality of pulses to revolution time periods indicative of a rotational rate of the rotating body;
        calculate a velocity of the rotating body at a start of each revolution of the rotating body based on the calculated angular velocity and an angular acceleration of the rotating body;
        produce a harmonic vibrational amplitude at a harmonic of the rotational rate of the rotating body; and
        represent a phase of the harmonic vibrational amplitude relative to the rotational position of the rotating body.

8. A system in accordance with claim 7, wherein the processor is further programmed to calculate an angular velocity of the rotating body based on measured time periods between each tachometer pulse.

9. A system in accordance with claim 7, wherein the processor is further programmed to calculate a velocity of the rotating body at an end of each revolution of the rotating body based on the calculated angular velocity and an angular acceleration of the rotating body.

10. A system in accordance with claim 7, wherein the processor is further programmed to calculate an angular position of the rotating body between each pulse of the tachometer to produce the harmonic vibrational amplitude.

11. A system in accordance with claim 7, wherein the processor is further programmed to represent the vibrational amplitude relative to the rotational position of the rotating body in polar form.

12. A system in accordance with claim 7, wherein the processor is further programmed to generate a plot of at least one of an acceleration, a velocity, and a displacement of the rotating body.

13. A processor for use in analyzing vibrations of a variable speed rotating body, said processor comprising:
a converter to convert a signal from at least one sensor to a numeric value that is indicative of a vibrational amplitude of a rotating body, wherein the signal is proportional to an acceleration of the rotating body; and
a device to convert a plurality of pulses from a tachometer to revolution time periods indicative of a rotational rate of the rotating body, wherein each pulse represents a revolution of the rotating body and is indicative of a vibration sample at a rotational position of the rotating body, the processor programmed to calculate an angular position of the rotating body between each pulse of the tachometer to produce a harmonic vibrational amplitude at a harmonic of the rotational rate of the rotating body, and represent a phase of the harmonic vibrational amplitude relative to the rotational position of the rotating body.

14. A processor in accordance with claim 13, wherein said processor is further programmed to calculate an angular velocity of the rotating body based on measured time periods between each tachometer pulse.

15. A processor in accordance with claim 13, wherein said processor is further programmed to calculate a velocity of the rotating body at a start of each revolution of the rotating body based on the calculated angular velocity and an angular acceleration of the rotating body.

16. A processor in accordance with claim 13, wherein said processor is further programmed to calculate a velocity of the rotating body at an end of each revolution of the rotating body based on the calculated angular velocity and an angular acceleration of the rotating body.

17. A processor in accordance with claim 13, wherein said processor is further programmed to represent the vibrational amplitude relative to the rotational position of the rotating body in polar form.

* * * * *